(12) United States Patent
Kato

(10) Patent No.: US 7,830,580 B2
(45) Date of Patent: Nov. 9, 2010

(54) SEMICONDUCTOR OPTICAL MODULATOR

(75) Inventor: Tomoaki Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/530,569

(22) PCT Filed: Feb. 6, 2008

(86) PCT No.: PCT/JP2008/051955

§ 371 (c)(1), (2), (4) Date: Nov. 9, 2009

(87) PCT Pub. No.: WO2008/111342

PCT Pub. Date: Sep. 18, 2008

(65) Prior Publication Data

US 2010/0142026 A1 Jun. 10, 2010

(30) Foreign Application Priority Data

Mar. 9, 2007 (JP) .............................. 2007-061083

(51) Int. Cl.
 G02F 1/03 (2006.01)
 G02B 26/00 (2006.01)
 G02B 6/10 (2006.01)

(52) U.S. Cl. ..................... 359/248; 359/237; 359/254; 359/257; 385/129

(58) Field of Classification Search ................ 359/237, 359/245, 248, 254, 257; 385/129, 130, 131
See application file for complete search history.

(56) References Cited

FOREIGN PATENT DOCUMENTS

| JP | 7-209618 | 8/1995 |
|---|---|---|
| JP | 10-333106 | 12/1998 |
| JP | 11-133366 | 5/1999 |
| JP | 2001-235713 | 8/2001 |
| JP | 2002-139717 | 5/2002 |
| JP | 2006-276497 | 10/2006 |

OTHER PUBLICATIONS

Kazunori Kimura, et al., "Kotaiiki Konoritsu Shinko Hakei Hikari Henchoki" Technical Report of IEICE, OQE87-26, May 18, 1987, pp. 95 to 102.
Tetsuhiko Ikegami, et al., "Handotao Photonics Kogaku", Corona Publishing Co., Ltd., Jan. 10, 1995, pp. 422 to 423.
Low Voltage Drive 40 Gb/s Semiconductor Mach-Zehnder Modulator, IEICE Tech. Rep., OPE2005-95, Nov. 3-4, 2005.

*Primary Examiner*—Jack Dinh
(74) *Attorney, Agent, or Firm*—Young & Thompson

(57) ABSTRACT

An optical modulator is provided with a stripe-shaped optical waveguide, which has an upper clad layer, a lower clad layer formed between the upper clad layer and a substrate, and an undoped core layer which is arranged between the upper clad layer and the lower clad layer and has a complex refractive index that changes corresponding to the intensity of an applied electric field, to a signal light propagating inside. On both sides of the stripe-shaped optical waveguide, conductor walls are configured by arranging a pair of parallel blocking flat boards with an insulating wall in between. Thus, the semiconductor optical modulator having a high optical modulation efficiency is provided.

11 Claims, 15 Drawing Sheets

SEMICONDUCTOR OPTICAL MODULATOR

TECHNICAL FIELD

The present invention relates to a structure of an optical modulation device. This application is based on Japanese Patent Application No. 2007-61083 that was filed on Mar. 9, 2007. The disclosure of the Japanese Patent Application is hereby incorporated into this application by this reference.

BACKGROUND ART

With the explosive increase in demands of broad band multimedia communication services of the Internet, video delivery, etc., introduction of longer-distance, larger-capacity and higher-reliability wavelength division multiplexed optical fiber communication systems is progressing rapidly. In addition, also in subscriber systems, optical fiber access services are rapidly coming into widespread use. In such optical fiber-communication systems, the wavelength multiplexing technique of multiplexing signal lights of a plurality of different wavelengths to transmit is widely employed from a viewpoint of reduction of installation cost of optical fibers that are optical transmission lines and enhancement of the transmission band efficiency per line of optical fibers.

The optical modulator that features capability of high-speed optical modulation and a small signal-light wavelength dependency and whose unnecessary optical phase modulation (wavelength chirping) that causes deterioration of a received light waveform at the time of long distance signal transmission is also small is a key component of an optical transmitter intended for wavelength division optical fiber communication systems. An MZ type light intensity modulator that an optical wave guide type optical phase modulator is incorporated into the Mach-Zehnder (MZ) interferometer is suited for such a use. As an MZ light intensity modulator currently in practical use, one that has a structure in which the waveguide type optical phase modulator using a titanium (Ti) diffused planer optical waveguide as a base and an optical multi/demultiplexer are monolithically integrated on a lithium niobate ($LiNbO_3$, LN) substrate, which is a typical electrooptic crystal, to constitute an MZ interferometer and electrodes for applying an electric field on this waveguide type optical phase modulator is provided in its vicinity is common. Although the LN-based an MZ optical modulator that is commercialized now has problems with respect to its dimensions (electrode length: about 5 cm, module length: about 15 cm) and a drive voltage (about 5 $V_{p-p}$), there is no practical optical modulator that surpasses this in terms of a high-speed long-distance optical transmission characteristic; therefore, it is widely used in optical transmitting units of various optical communication systems.

In a case where performing high-speed optical modulation using such an optical modulator, especially in a domain where a frequency of a modulation RF signal that is a driving signal exceeds 1 GHz, the propagation wavelength of the modulation RF signal becomes short to a degree that cannot be ignored to the electrode length of an optical phase modulator region in the LN optical modulator. For this reason, an electric potential distribution of an electrode structure that is means adapted to apply an electric field to the optical phase modulator cannot be assumed to be uniform in the longitudinal axis direction any more. In order to estimate optical modulation characteristics correctly in such a case, it is necessary to deal with this electrode structure and the modulation RF signal propagating there as a microwave transmission line and a traveling wave, respectively. In this case, at raveling wave electrode structure is required. In the traveling wave electrode structure, a contrive that brings the respective phase velocities $v_o$ and $v_m$ close to each other as much as possible (attaining velocity matching) so that an effective interaction length of a modulated optical signal propagating in the optical-phase modulator region and the modulation RF signal can be set as long as possible.

When realizing the optical phase modulator of an optical waveguide type and the MZ type optical modulator using III-V compound semiconductors, such as GaAs and InP that are useful in realizing light source elements, a technique where a single mode optical waveguide of a p-i-n type diode structure is constructed, and a reverse bias voltage is applied to this is used widely. The p-i-n type diode structure is constructed by forming an undoped core layer with a medium whose refractive index varies with the electric field intensity and sandwiching this with clad layers that have conductivities of p-type and n-type, respectively.

In the 1310 to 1650-nm band that is common in optical fiber communications, when providing an electrode in a single mode optical waveguide of a practical p-i-n type diode structure and dealing with this as a transmission line for the modulation RF signal, following problems arise. Due to an influence of the p-type semiconductor clad layer whose conductivity is generally low compared with that of the n-type, a (complex) characteristic impedance (absolute value thereof) of this transmission line that the modulation RF signal senses falls to the order of about 20Ω, about ½ time the representative characteristic impedance (50Ω) of the microwave circuit. As a result, there are problems in practical applications that include a restriction of a modulation frequency band due to reflection arising from impedance mismatch with a drive circuit etc. and bringing about of increase in driving current. Moreover, the effective complex refractive index $n_m$ (=$c_0/v_m$, $c_0$: the velocity of light in free space) that the modulation RF signal senses also becomes around 7 in average for the same reason, and therefore, it will make a difference between itself and the effective refractive index $n_o$ (=$c_0/v_o$, approximately 3.5, $v_o$: the velocity of light in the medium) of the modulated optical signal, which is as much as about two times. Such velocity mismatch between modulated signal light and the modulation RF signal has a disadvantage that restricts the effective interaction length of the both and brings about the same problems related to the modulation frequency band and the drive voltage as that of the case where there is the impedance mismatch.

In this way, when adopting the traveling wave type electrode structure for an optical phase modulator or the electro-absorption type light intensity modulator, the p-i-n type diode structure involves a problem in attaining reduction in an operation voltage and a broad band.

On the other hand, the n-i-n type layered structure has a structure in which the p-type semiconductor clad layer that is the ground of the above-mentioned problems is replaced by an n-type semiconductor clad layer having the inverse conductivity. With the n-i-n type layered structure, it is possible to suppress the above-mentioned impedance mismatch and velocity mismatch to be small intrinsically and thereby, compatibility of the drive voltage amplitude reduction by elongating the element and attainment of broader band can be expected. These features are suitable to the traveling wave electrode structure that is advantageous when realizing a low-voltage and high-speed modulation operation of an optical modulator that is based on a semiconductor optical waveguide element, such as an electro-absorption optical modulator and an optical phase modulator. However, since if the bias voltage is applied to the both ends of the n-i-n layered structure as it is, electrons will be injected into the undoped layer and it becomes impossible to apply the electric field to the undoped layer, it is necessary to modify the structure into an n-SI-i-n type layered structure that sandwiches a semi insulating (SI) semiconductor (SI) layer practically. As an example applying this layered structure, an InP based semiconductor MZ light intensity modulator is reported (Kikuchi et al., "Low Voltage Drive 40 Gb/s Semiconductor Mach-Zehnder Modulator," Institute of Electronics, Information and Communication Engineers, IEICE Tech. Rep., Optical Electronics, OPE2005-95, Nov. 3-4, 2005, hereinafter described as Non-patent Document 1).

The followings are documents pertaining to the optical modulator: Japanese Laid-Open Patent Application JP-P2001-235713A (Patent Document 1), Japanese Laid-Open Patent Application JP-P2002-139717A (Patent Document 2), and Japanese Laid-Open Patent Application JP-P1999-133366A (Patent Document 3).

DISCLOSURE OF INVENTION

In the Non-patent Document 1, a high-mesa ridge structure is described. This high-mesa ridge structure is formed as follows: each of a pair of optical phase modulator regions constituting a semiconductor MZ light intensity modulator is formed: by an n-SI-i-n layered structure including an n-InP upper clad layer, an SI—InP layer, an undoped InGaAlAs/InAlAs multi-quantum well core layer such that the transition wavelength between the first quantized levels of electron and heavy hole is 1370 nm and its thickness is 0.3 µm, and an n-InP lower clad layer, being processed to a mesa stripe shape of a width of 2 µm using a dry etching technique and; by its both sides being buried with an SiN film and a low dialectic constant resin (Benzocyclobutene; BCB). It is thought that this structure is adopted for following reasons. When attaining miniaturization of elements, it becomes a challenge to form bend optical waveguides that connect an optical phase modulator region and an optical multi/demultiplexer smoothly. In order to enlarge a transverse direction confinement coefficient as an optical waveguide to an optical signal so that a loss arising from signal light radiation in this bend optical waveguide can be suppressed as much as possible, the high-mesa ridge structure is adopted.

However, on account that such a high-mesa ridge structure generally has a high transverse light confinement coefficient, it is apprehended inversely that propagation of the signal light in a transverse higher mode is brought about. Therefore, in the processing, high-accuracy control of the optical waveguide width (namely, high-mesa ridge width) is sought for. There is a fear that such high-order mode components generated in the optical waveguide are coupled with radiation waves in bends or discontinuities, and as a result degradation of optical modulation characteristics and an increase in insertion loss are brought about. The optical waveguide disclosed in the Non-patent Document 1 is considered to be a multimode optical waveguide in a transverse direction in a 1550-nm band, and the above-mentioned problem cannot be ignored. The reason that although there is such an apprehension, the optical waveguide width is dared to be set to 2 µm is that this high-mesa ridge structure can satisfy the above-mentioned velocity matching condition and the impedance matching condition simultaneously only with the condition of this width.

It is desired that an ideal traveling wave type semiconductor optical phase modulator satisfies following four conditions.

(1) An impedance matching condition as a transmission line in which a modulation RF signal is made to transmit.

(2) A velocity matching condition as a traveling wave type electrode between a modulation RF signal and a modulated optical signal.

(3) A single mode propagation condition required as a waveguide type optical phase modulator.

(4) An optimal undoped layer thickness that generates electric field strength sufficient to vary the (complex) refractive index with a limited bias voltage.

In short, in order to realize a structure that satisfies these conditions simultaneously, a design degree-of-freedom of structure parameter is short of one degree-of-freedom. Further, the high-mesa ridge structure has a following apprehension. The ellipticity of the fundamental propagation mode is large, and consequently when making the signal light couple with an optical fiber for input and output, the structure is liable to generate a coupling loss due to mode mismatch. Moreover, the structure easily brings about reliability degradation arising from a leakage current at aside face of an undoped core layer formed by etching.

On the other hand, as a structure that satisfies the above-mentioned condition (3) that becomes not satisfied in order to make use of an advantage of the n-SI-i-n structure, a buried hetero (SI-BH) structure in which side walls are buried with an SI layer having a same refractive index is advantageous. Although such a SI-BH structure is somewhat disadvantageous for the high-mesa ridge structure from a viewpoint of miniaturization of bend optical waveguides, it easily relaxes a dimensional accuracy of a width at the time of processing an optical waveguide stripe, is advantageous in reliability because the undoped core layer side faces exist inside the semiconductor, and is extremely advantageous in attaining monolithic integration with a light source element having the SI-BH structure similarly. However, also when the n-SI-i-n layered structure is modified into the SI-BH structure, the conditions of above-mentioned (3) and (4) can be satisfied easily, but all the conditions including the conditions of (1) and (2) cannot be satisfied simultaneously all the same due to an influence of a high relative dielectric constant of the SI-BH structure (about 12 or so in compound semiconductors).

Although the n-SI-i-n structure is expected for ideally high-speed and low-voltage driving as a traveling wave type semiconductor optical phase modulator, neither the high-mesa ridge structure nor the SI-BH structure can satisfy the conditions of the above-mentioned (1) to (4) simultaneously, and a practical semiconductor optical modulator has not been realized as things stand.

When constructing an optical modulator with a compound semiconductor, restrictions to the optical modulation efficiency is a problem that arises from two of the velocity mismatch by an increase of the effective refractive index of the modulation RF signal and the impedance mismatch with a drive circuit side by a fall of the characteristic impedance. An object of the present invention is to, against these problems, realize a structure capable of solving these simultaneously using ingeniously boundary conditions that an electromagnetic field satisfies using a manufacture that is very simple and is consistent with existing device process techniques. By this invention, an effective and practical means adapted to open a road of miniaturization, attaining a broader band, lowering a drive voltage, light source integration of a semiconductor optical modulation characteristic is provided.

A semiconductor optical modulator according to the present invention is includes a heterostructure single mode semiconductor optical waveguide, below cut-off parallel plates including a pair of conductor walls, and a pair of electrodes. The heterostructure single mode semiconductor optical waveguide includes a stripe optical waveguide and a pair of a semi-insulating buried layer formed to sandwich the stripe optical waveguide from its right and the left. The stripe optical waveguide is constructed by layering a lower clad layer formed on a semiconductor substrate and having a first conductivity, an undoped core layer in which a complex refractive index for a signal light propagating therein is changed in response to the strength of an applied electric field, and an upper clad layer having a second conductivity, which are layered in this order from lower layer. The below cut-off parallel plates are composed of a pair of conductor walls, arranged on a side wall of the semi-insulating buried layer on a side to which the stripe optical waveguide is not contacted, and arranged on the left and right of the stripe optical waveguide. The pair of electrodes provides potentials to the lower clad layer and the upper clad layer independently, and forms a transmission line in which an RF signal propagates in parallel with a signal light propagating in the undoped core layer.

In a semiconductor optical modulator according to the present invention, at least one of the pair of below cut-off parallel plates is in conduction with either one of an upper electrode in conduction with the upper clad layer or a lower electrode in conduction with the lower clad layer.

In a semiconductor optical modulator according to the present invention, the pair of below cut-off parallel plates has a same potential with one another.

In a semiconductor optical modulator according to the present invention, both the upper clad layer and the lower clad layer are formed by an n-type semiconductor.

A semiconductor optical modulator according to the present invention further includes an electron injection stop layer arranged between at least one of the upper clad layer and the lower clad layer, and the undoped core layer.

In a semiconductor optical modulator according to the present invention, the electron injection stop layer is formed by a semi-insulating semiconductor doped with ruthenium or iron.

In a semiconductor optical modulator according to the present invention, the electron injection stop layer is formed by a p-type semiconductor doped with Zinc, Beryllium, or carbon was doped.

A semiconductor optical modulator according to the present invention further includes a p-type semiconductor layer whose thickness is 10 nm or less and whose impurity concentration is higher than an electron trap concentration of the electron injection stop layer inwardly from a plane of the electron injection stop layer that is in contact with the undoped core layer.

In a semiconductor optical modulator according to the present invention, light is modulated by the Franz-Keldysh effect, the Pockels effect, the quantum confinement Stark effect, or the quantum confinement Pockels effect in the undoped core layer.

In a semiconductor optical modulator according to the present invention, the stripe optical waveguide is coupled to a wavelength tunable light source formed on the substrate through an optical multiplexer and demultiplexer formed on the substrate.

A semiconductor Mach-Zehnder type optical modulator according to the present invention includes a semiconductor optical modulator according to the present invention which is built in at least one of a pair of optical waveguides forming an optical waveguide type Mach-Zehnder type optical interferometer.

The present invention enables a traveling wave type optical phase modulator to be manufactured in an elongated dimension that is advantageous for reduction of the drive voltage without impairing broadband performance thereof while suppressing its insertion loss to a practical value, and as a result provides means adapted to realize an ideal optical modulator that features a high-speed, a low-voltage, a low insertion loss, and a capability of being monolithically integrated with a light source element, and that further enables expectation of realizing high-reliability. To be more in detail, following effects are acquired.

An effect of the present invention is to make it possible to suppress velocity mismatch between a modulation RF signal and a modulated signal light that has been a problem in the traveling wave type semiconductor optical modulator to a practically harmless degree.

The first reason of it is as follows. In an element according to the present invention, a pair of conductors that constitutes below cut-off parallel plates to an electric field applied to an undoped core layer is provided on both sides of this undoped core layer. Therefore, a wavenumber (phase constant, propagation constant) that is a fundamental propagation characteristic as a transmission line can be controlled over a wide range by changing the distance between the pair of conductors. Incidentally, the shielding that is refereed to here is not restricted only to a case where propagation of an electromagnetic wave is completely inhibited literally. The shielding is used as a term that expresses a term of idea, a phase velocity control in a broad sense and that also includes a state where a phase velocity of an electromagnetic wave propagating between a pair of conductor plates and having an electric field component parallel to this changes depending on this distance between the conductor plates. Naturally, the phase velocity of an electromagnetic wave propagating between the pair of conductor plates and having an electric field component perpendicular to this will not change even if this distance of the conductor plates is adjusted.

The second reason is as follows. It can be expected that after conquering the problem of the above-mentioned velocity mismatch, relaxation of mismatch between the characteristic impedance as a transmission line and an output impedance of a general optical modulator drive circuit can be achieved additionally. Because, since the electromagnetic field distribution of the modulation RF signal tends to distribute widely from around the undoped core layer toward a semiconductor substrate side due to this below cut-off parallel plate structure, the use of a semi-insulating semiconductor as a substrate makes the characteristic impedance that the modulation RF signal senses higher. Therefore, it becomes easy to match it with 50Ω that is the characteristic impedance of general high-frequency components.

The third reason is as follows. By the effects described in the first and second reasons, it can be expected that a frequency response characteristic will become broader band and the drive voltage will be reduced. This is because, by the velocity mismatch being relaxed, it becomes possible to lengthen an interaction length of a modulated signal light and a modulation RF signal further, and an electric field strength required to generate a certain phase change can be made smaller. Moreover, this is because it becomes possible to suppress degradation of a modulation frequency characteristic by reflection arising from the above-mentioned impedance mismatch.

The fourth reason is as follows. Process simplification of a manufacturing process, improvement in the yield, and cost reduction accompanying it can be expected. This is because this below cut-off parallel plate structure can be realized by general semiconductor manufacturing processes. Thereby, it is not necessary to introduce new facilities only for manufacturing a semiconductor optical modulator according to the present invention, and man-hour for new condition finding etc. is suppressed to a minimum.

BEST MODE FOR CARRYING OUT THE INVENTION

First Embodiment

Hereafter, best mode embodiments for carrying out the present invention will be described in detail referring to drawings. In the present embodiment, a pair of conductor walls almost parallel to the electric field applied to an undoped core layer is provided on both sides of this undoped core layer, and this will functions as below cut-off parallel plates to a modulation RF signal.

Figure 1A:
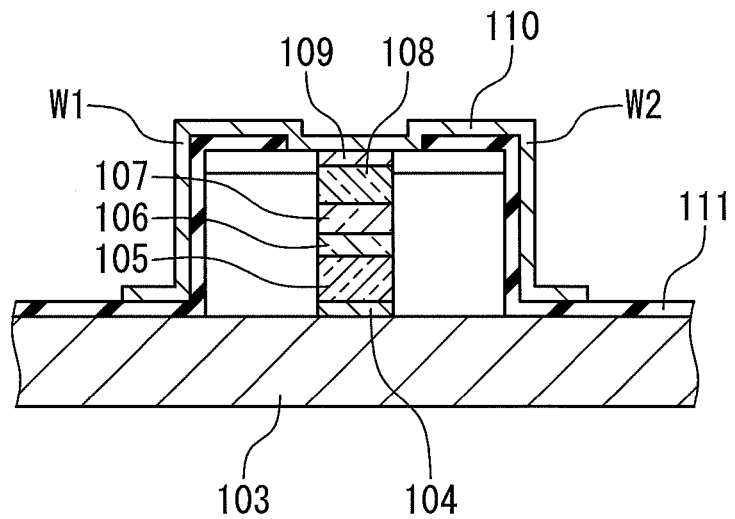
FIG. 1A is a sectional view showing a semiconductor optical modulator equipped with below cut-off parallel plates.

FIG. 1A is a sectional view showing a concrete configuration thereof. The optical modulator in the present embodiment includes a buffer layer 104 formed on a semi-insulating semiconductor substrate 103, a lower clad layer 105 formed on the buffer layer 104, an undoped core layer 106 formed on the lower clad layer 105, an electron injection stop layer 107 formed on the undoped core layer 106, an upper clad layer 108 formed on the electron injection stop layer 107, the upper clad layer 108, and a contact layer 109 formed on the upper clad layer 108. This layered structure forms a stripe shape in which the normal direction of the paper sheet of FIG. 1A is set to the longitudinal direction of a waveguide (traveling direction of an optical signal). On this layered structure, an upper electrode 110 that is conducted with the contact layer 109 is formed.

On a side wall on a direction perpendicular to the longitudinal direction of the stripe structure, a first conductor wall part W1 is disposed through a buried layer. On a side wall of the opposite side of the stripe structure to the first conductor wall part W1, a second conductor wall part W2 is disposed in parallel to the first conductor wall part W1 through the buried layer (SI-BH structure). In FIG. 1A, the first conductor wall part W1 and the second conductor wall parts W2 are a part of the film that is formed by a process of forming the upper electrode 110 together with it. The first conductor wall part W1 and the second conductor wall part W2 constitute parallel plates for shielding an electric field applied to the undoped core layer 106.

Figure 1B:
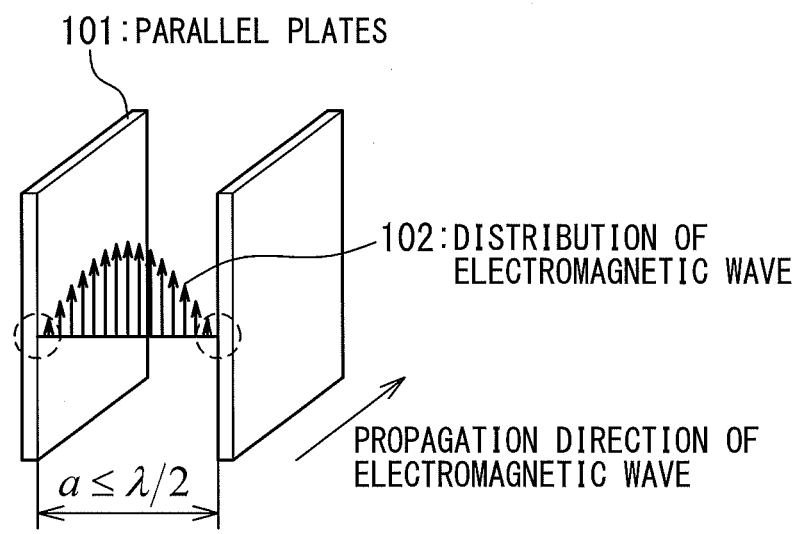
FIG. 1B shows a distribution of an electric field component that is parallel to below cut-off parallel plates.

FIG. 1B shows this parallel plates and a distribution of an electromagnetic wave. By the parallel plates 101, the electric field applied to the undoped core layer becomes a distribution 102 of an electromagnetic wave that resonates for a half wavelength between the pair of parallel conductor walls, and a wavenumber (or phase constant, propagation constant) of a modulation RF signal along the longitudinal axis direction of the optical waveguide decreases by an influence of this half-wavelength resonance. This means that the wavenumber of a modulation RF signal can be controlled by the distance between a pair of conductor walls.

Figure 2A:
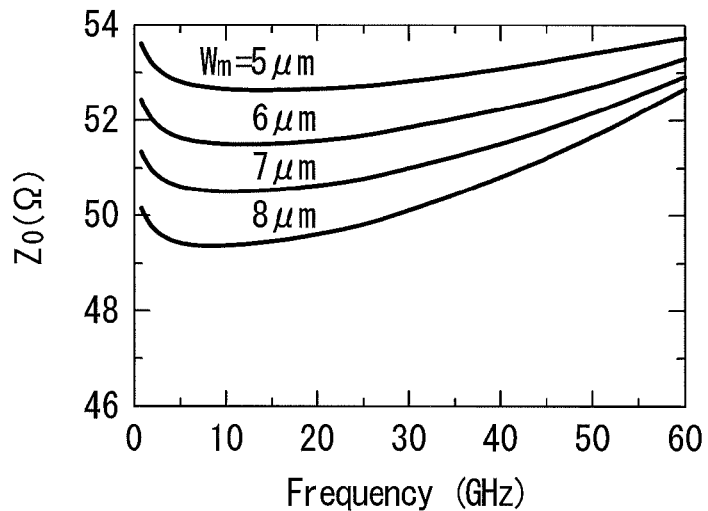
FIG. 2A shows the characteristic impedance of an optical modulator.
Figure 2B:
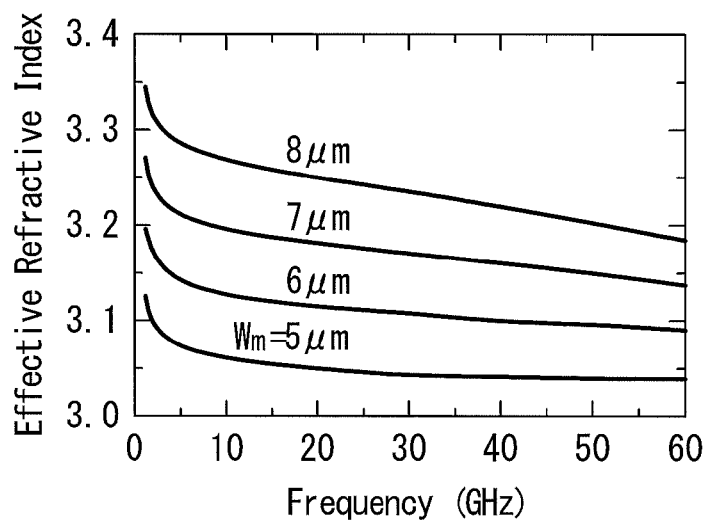
FIG. 2B shows the effective refractive index of the optical modulator.
Figure 2C:
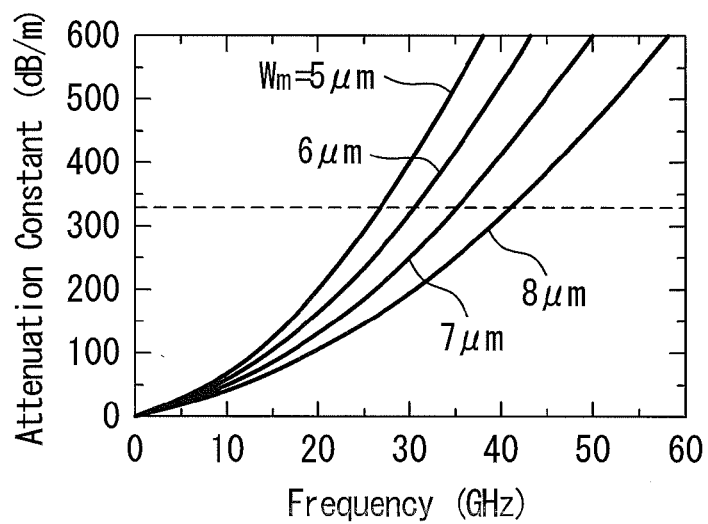
FIG. 2C shows an attenuation constant of the optical modulator.
Figure 3A:
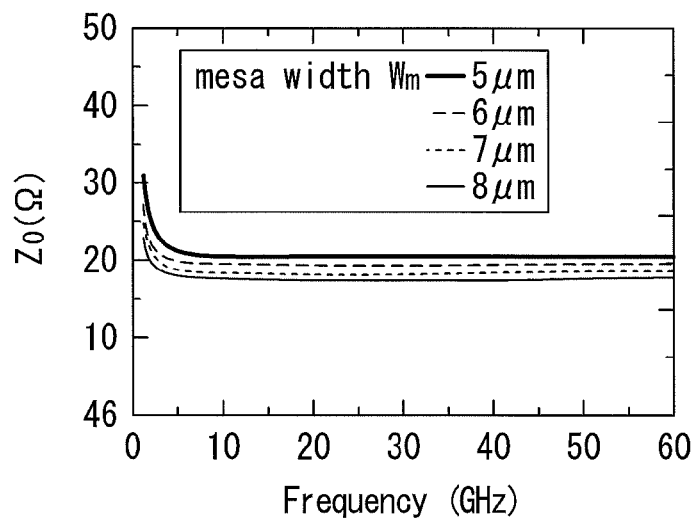
FIG. 3A shows the characteristic impedance of a conventional optical modulator.
Figure 3B:
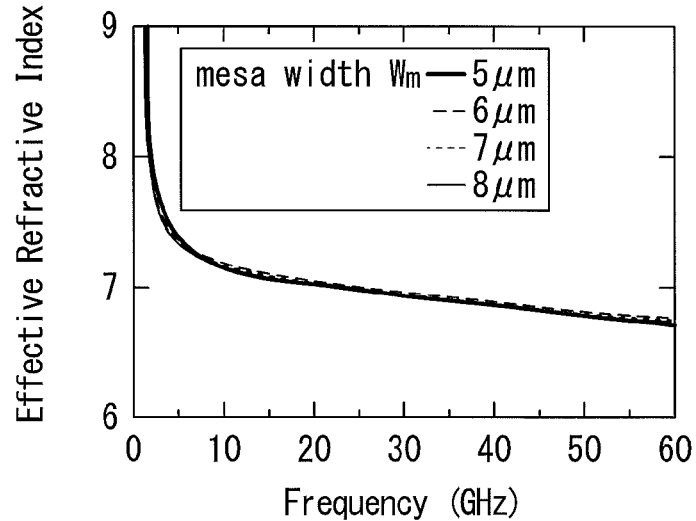
FIG. 3B shows the effective refractive index of the conventional optical modulator.
Figure 3C:
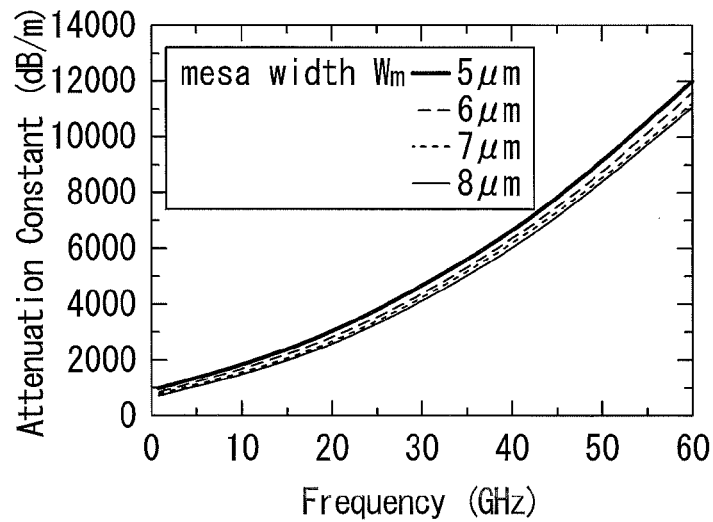
FIG. 3C shows an attenuation constant of the conventional optical modulator.

FIGS. 2A to 2C show the characteristic impedance, the effective refractive index, and an attenuation constant in an optical modulator according to the present embodiment, respectively. FIGS. 3A and 3B show characteristics of a conventional optical modulator corresponding to the respective figures. As shown in FIG. 2B, it can be shown that the wave-number of a modulation RF signal is controlled by the distance Wm of the conductor walls. There is no special restriction on respective electric potentials of the pair of conductor walls, and for example, either in the case of different electric potentials or in the case of the same electric potentials, the two cases are basically the same with respect to an influence exerted on the phase velocity of an electromagnetic wave. Similarly, this is the same in a case where these are in conduction with either an upper or a lower electrode. For this reason, a structure in which this pair of conductor walls that constitutes the below cut-off parallel plates is one piece molded with the upper electrode and other structures are considered to be practical mainly from a viewpoint of simplification of the manufacturing process and others.

Generally, in an SI-BH structure single mode optical waveguide, the fundamental propagation mode of a modulated optical signal is attenuated sufficiently at a position away from a side wall of the undoped core layer by 2 μm or more toward the SI-BH layer. Therefore, by arranging the pair of conductor walls in this region, the influence on a propagation characteristic of the fundamental propagation mode of modulated signal light can be suppressed to an ignorable level practically. This characteristic means that by simply changing the distance between the pair of conductor walls, the effective refractive index of a modulation RF signal can be controlled freely without affecting the propagation characteristic of the modulated optical signal at all. That is, a design freedom that is important in achieving lower voltage, a broader band, etc. of an optical modulation characteristic can be acquired. Such conductor walls can be easily realized, for example, only by providing a groove in the SI-BH layer by etching etc. and forming and arranging a part of the upper electrode and lower electrode against it.

Moreover, the attenuation can be suppressed to a practical value at which an influence to optical modulation characteristics is considered to remain in a level as possible as minimum, in a case, for example, in 40 GHz band provided that the length is in a range of several mm, as shown in FIG. 2C. Furthermore, the characteristic impedance that a modulation RF signal propagating this structure senses can be almost matched (as a practical range, within about ±10%) to 50Ω that is a value widely used in the RF signal input/output path of microwave devices in a range of practical structure dimensions of a semiconductor optical waveguide element intended for an optical fiber communication system. Note that, this value of the characteristic impedance is controllable also by changing the distance between an electrode portion in conduction with the pair of conductor walls and a buffer layer, an opposing area, etc.

As described in "Disclosure of Invention," there is a problem that the four conditions shown in (1) to (4) cannot be satisfied simultaneously when the n-SI-i-n layered structure, which is expected to achieve a broad band and low voltage modulation being ideal for a traveling wave typ0e optical modulator, is modified to a buried structure that is easily made to be a single mode, is also excellent in reliability, and is suitable to light source integration. According to a semiconductor optical modulator according to the present embodiment, regarding this problem, by providing a pair of parallel conductor walls and making this function as a below cut-off parallel plates of an electric field applied to the undoped core layer, a structure capable of easily controlling the effective refractive index of a modulation RF signal is realized simply by changing the distance between the pair of conductor walls.

Furthermore, the effects of the present invention described above holds for other than this structure, for example, a p-i-n layered structure having no electron injection stop layer, an n-i-SI-n layered structure in which the order of lamination of each layer forming a stripe optical waveguide is altered, and a layered structure like an n-SI-i-SI-n layer where one more electron injection stop layer is added further so that a built-in electric field in a non bias state is suppressed. Moreover, from a viewpoint of reducing a voltage amplitude required for an optical modulation operation, a structure having a p-type semiconductor layer around a region where the electron injection stop layer is in contact with the undoped core layer. The impurity concentration of this p-type semiconductor layer is higher than the electron trap density of the electron injection stop layer. From a viewpoint of suppressing the propagation loss of a signal light in this p-type semiconductor layer, it is suitable that its thickness is about 10 mm, and that the layer is provided at a position away from a contact surface of the undoped core layer and the electron injection stop layer toward the electron injection stop layer by within about 20 nm. Furthermore, as a semi-insulating semiconductor used for the SI-BH layer and the electron injection stop layer, a semi-insulating semiconductor into which iron (Fe) or ruthenium (Ru) is doped as an impurity is suitable. Especially, Ru has an ideal feature of being hard to cause mutual solid phase diffusion with zinc (Zn), which is a typical p-type impurity, in InP and is especially suitable for a case of manufacturing a structure sandwiching the above-mentioned p-type semiconductor. Incidentally, as the electron injection stop layer, it is also possible to use a p-InP layer into which zinc, or beryllium, or carbon is doped instead of SI—InP.

Second Embodiment

Figure 4A:
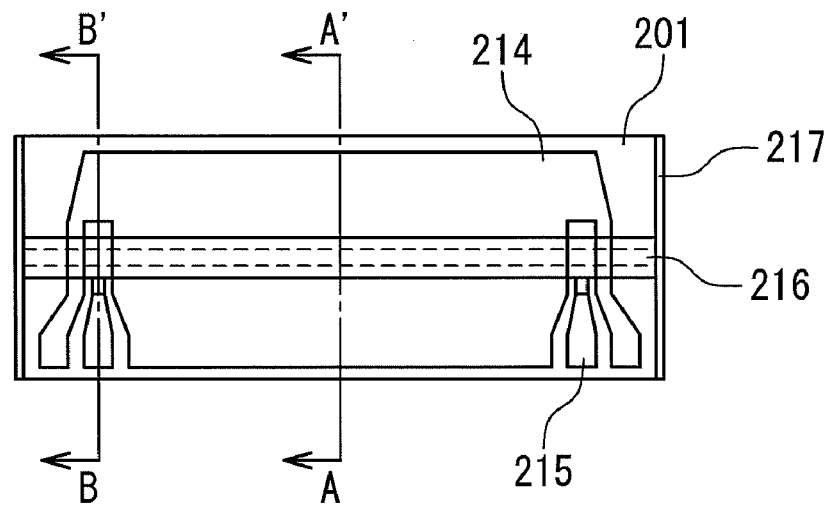
FIG. 4A is a plan view of an optical modulator.
Figure 4B:
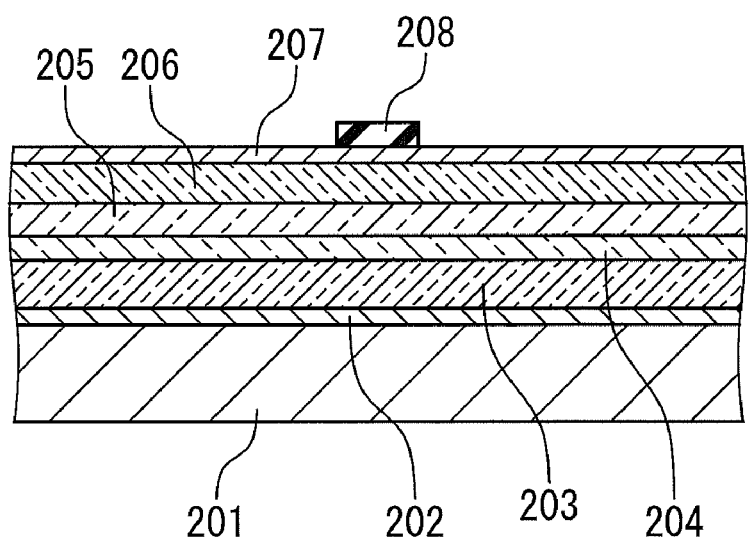
FIG. 4B shows one step of a manufacturing process of the optical modulator.
Figure 4C:
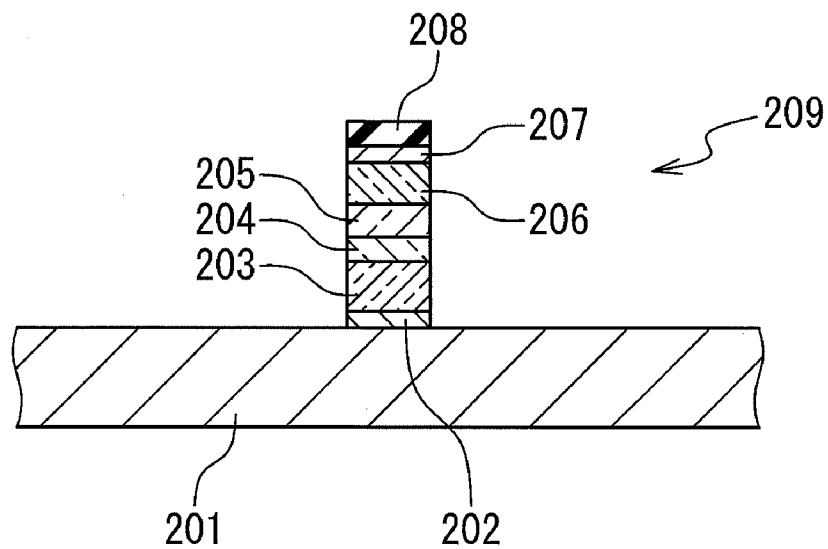
FIG. 4C shows one step of the manufacturing process of the optical modulator.
Figure 4D:
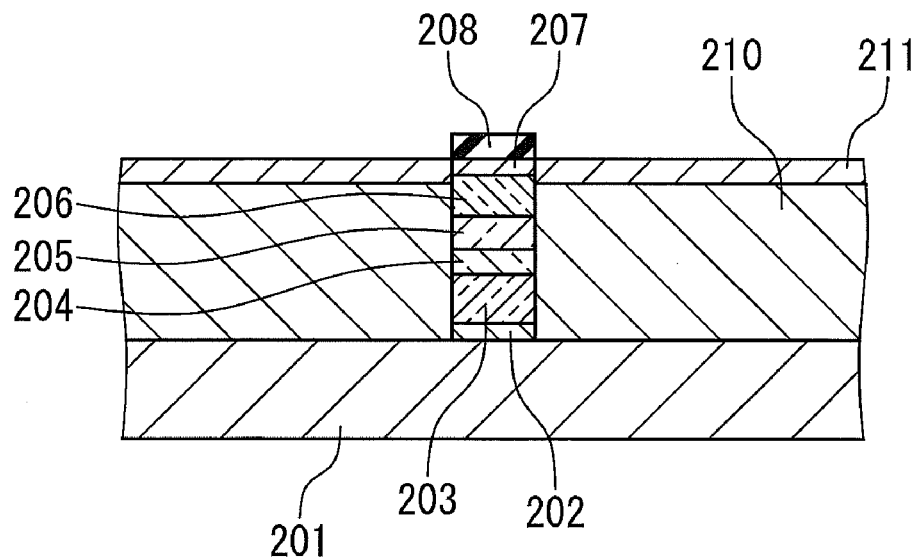
FIG. 4D shows one step of the manufacturing process of the optical modulator.
Figure 4E:
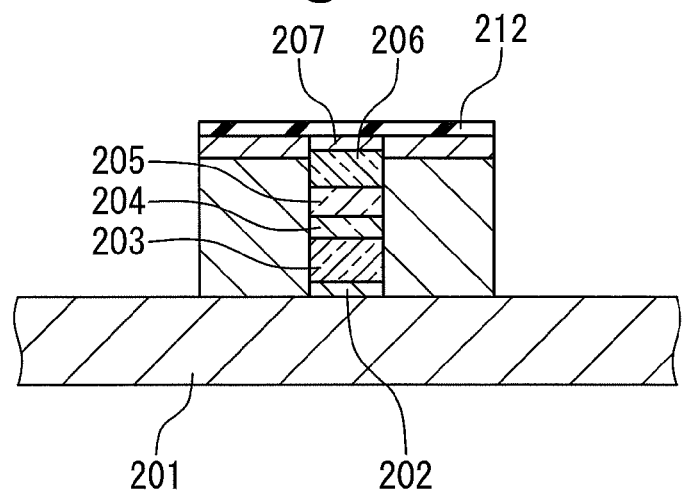
FIG. 4E shows one step of the manufacturing process of the optical modulator.
Figure 4F:
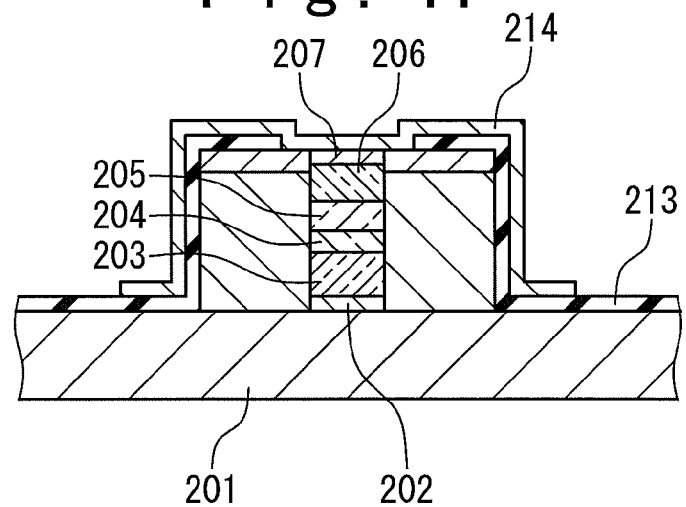
FIG. 4F shows a cross section of the optical modulator.
Figure 4G:
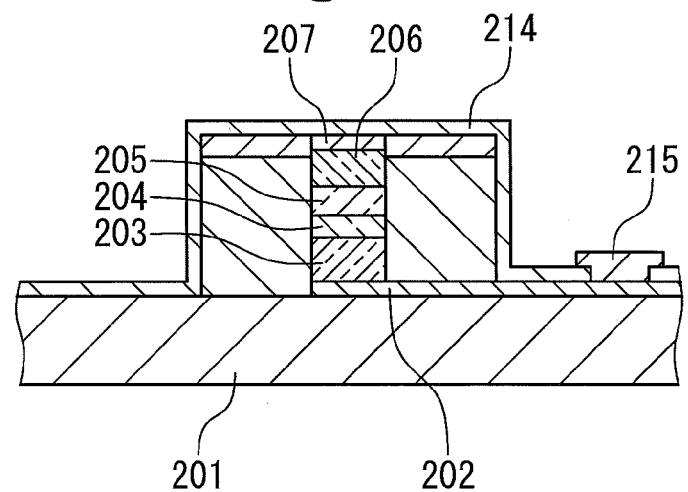
FIG. 4G shows a cross section of the optical modulator.

FIG. 4A is a plan view showing a configuration of a semiconductor optical modulator in a second embodiment of the present invention. FIGS. 4B to 4G are sectional views showing a manufacturing process of the semiconductor optical modulator. FIG. 4B shows a cross-sectional structure at the time when the first crystal growth has been completed. FIG. 4C shows a cross-sectional structure at the time when a stripe processing by etching is done. FIG. 4D shows a cross-sectional structure at the time when a process up to buried growth has been completed. FIG. 4E shows a cross-sectional structure at the time when grooves are formed on both sides of an optical waveguide stripe. FIGS. 4F and 4G are diagrams showing cross-sectional structures taken along a line A-A' and a line B-B' after electrode formation, respectively. An upper electrode 214 and a lower electrode 215 provide independent electric potentials to the lower clad layer and the upper clad layer, respectively, and constitute a transmission line in which an RF signal propagates in parallel with a signal light which propagates the undoped core layer.

That is, this element is formed as follows. A buffer layer 202, a lower clad layer 203, an undoped core layer 204, an insulating layer 205, an upper clad layer 206, and a contact layer 207 are continuously formed on a semi-insulating semiconductor substrate 201 by the first crystal growth, sequentially from lower layer. By an etching stop mask 208 of a stripe shape being formed on a surface of the contact layer 207 and these layers being etched, a stripe optical waveguide 209 is formed. In the second crystal growth, by this stripe optical waveguide 209 being buried by buried layers 210 and a buried contact layer 211, the so-called high-resistance buried (SI-BH) structure is formed. The buried layers 210 sandwich the stripe optical waveguide 209 from the right and the left, i.e., from the both sides in a direction perpendicular to the wave guiding direction.

Next, on this surface, an etching stop mask 212 is formed, and the buried layers 210 and the buried contact layer 211 are etched to a desired width. Following this, an insulating film 213 is formed on the surface, an opening is provided near the contact layer, and subsequently an electrode film is formed over the whole surface. This electrode functions as the below cut-off parallel plates to the electric field of a modulation RF signal applied to the undoped core layer 204. By adjusting a width of the etching stop mask 212 to control the width of the parallel plates, the effective refractive index and the characteristic impedance of the modulation RF signal propagating thereon are controlled.

Following this, this electrode is separated into the upper electrode 214 and the lower electrode 215 by the photolithography technique and etching. Around the signal light input/ emission end faces, in order to inhibit modulation RF signals from propagating there, after the contact layer 207 and the buried contact layer 211 are partially removed, a higher-resistance region 216 whose conductivity is suppressed by ion implantation is formed. Finally, both ends of the optical waveguide are cleaved and both end faces are treated to have each a low reflective film 217 thereon, whereby signal light input/emission end faces are formed.

Next, an operation of an optical semiconductor optical modulator in the second embodiment will be described. The upper electrode 214 and the lower electrode 215 are connected to a drive circuit, and an electric field is applied to the undoped core layer 204. Consequently, by receiving an effect of the below cut-off parallel plates that are formed with a same film as that of the upper electrode 214, the wavenumber of the electric field of a modulation RF signal becomes small and its effective refractive index approaches to that of the signal light, and with this, the fall of the characteristic impedance that the modulation RF signal senses can also be suppressed. Thereby, it becomes possible to make the optical modulator according to the present embodiment operate as an ideal traveling wave type optical phase modulator in which the above-mentioned velocity matching and the impedance matching are almost compatible.

Figure 5A:
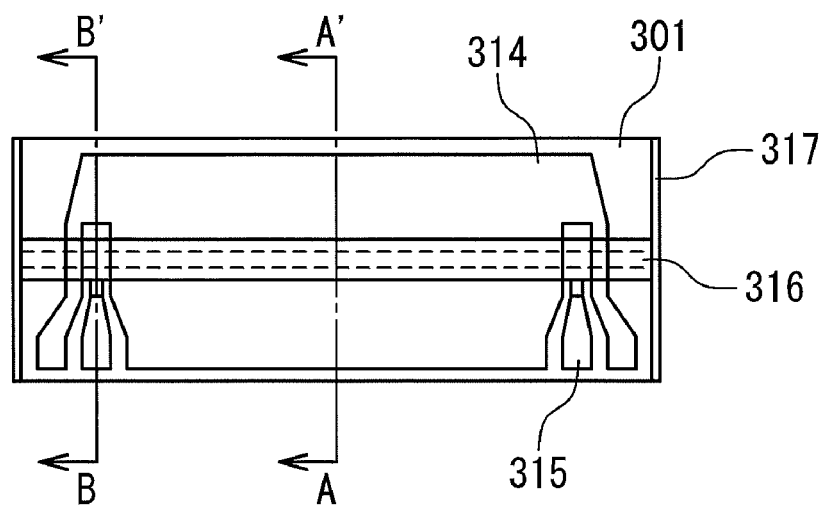
FIG. 5A is a plan view of an optical modulator.
Figure 5B:
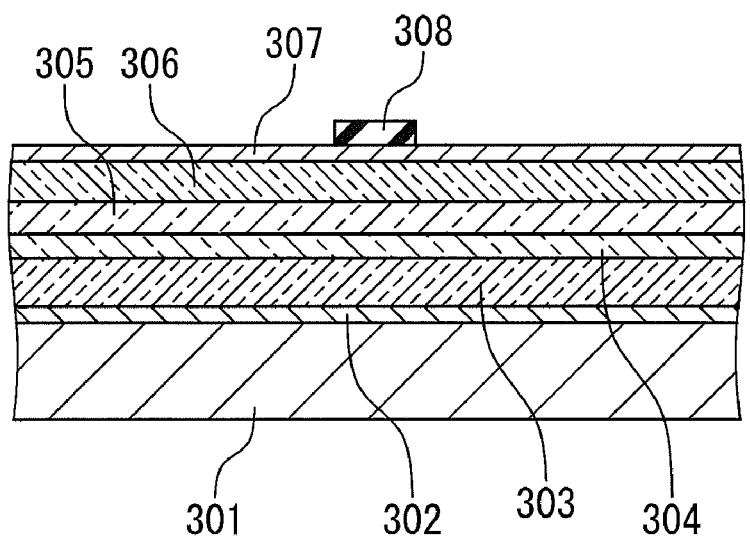
FIG. 5B shows one step of the manufacturing process of the optical modulator.
Figure 5C:
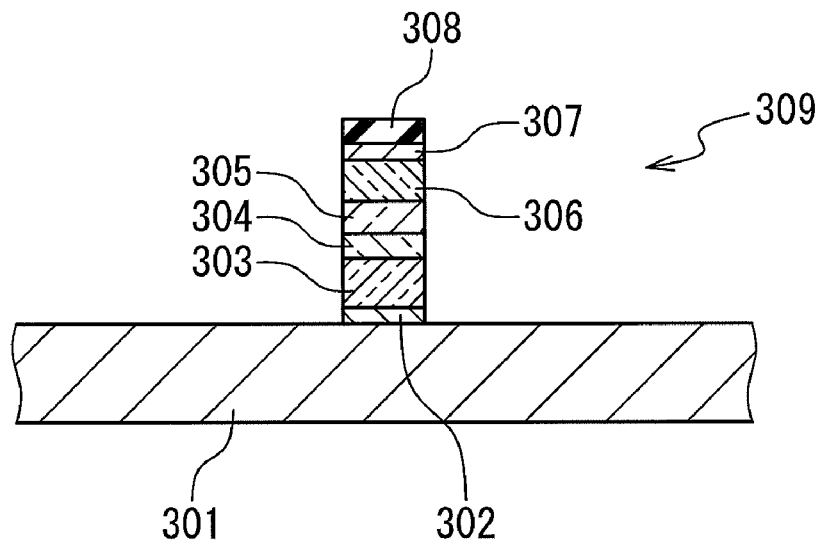
FIG. 5C shows one step of the manufacturing process of the optical modulator.
Figure 5D:
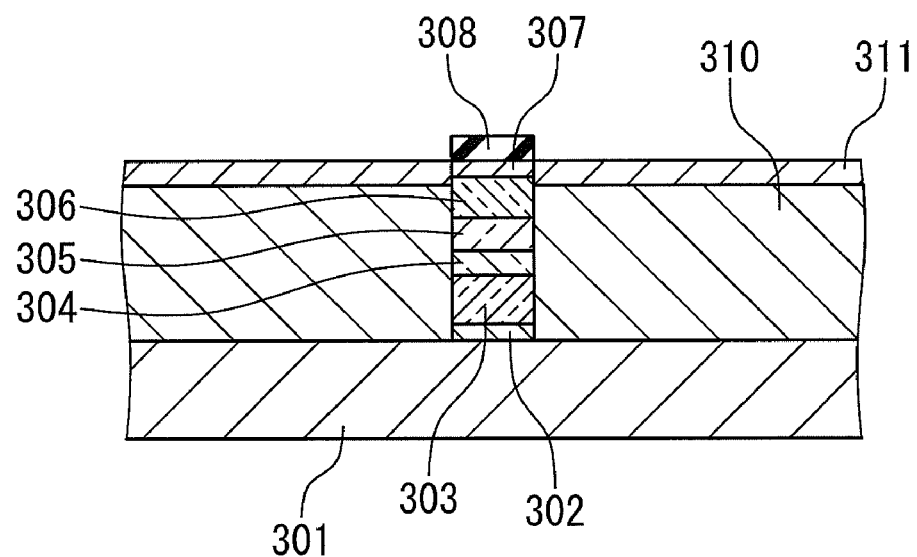
FIG. 5D shows one step of the manufacturing process of the optical modulator.
Figure 5E:
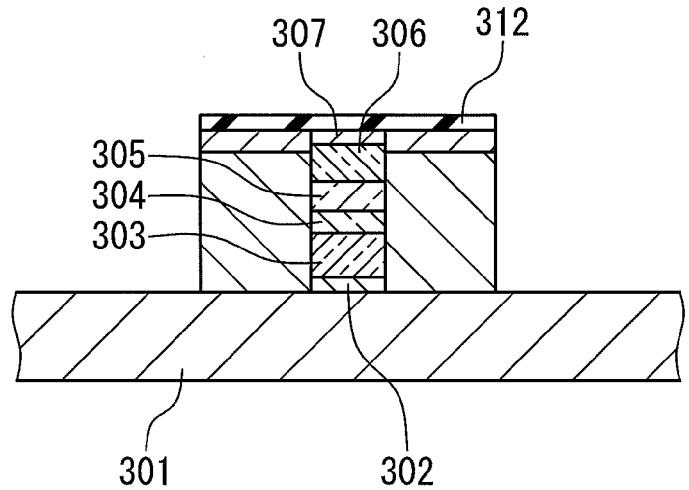
FIG. 5E shows one step of the manufacturing process of the optical modulator.
Figure 5F:
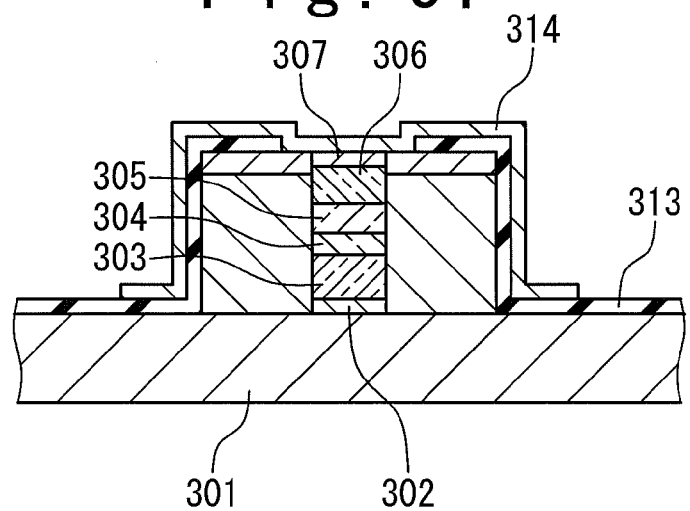
FIG. 5F shows a cross section of the optical modulator.
Figure 5G:
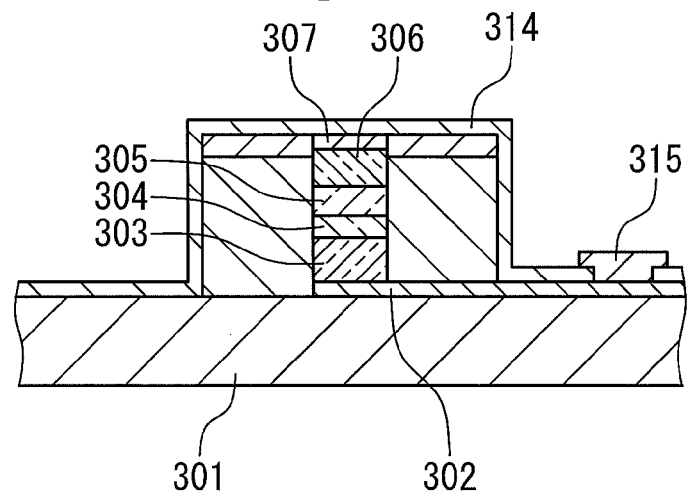
FIG. 5G shows a cross section of the optical modulator.

FIG. 5A is a plan view showing an embodiment of the present invention where the second embodiment is verified in a semiconductor optical phase modulator. FIGS. 5B to 5G are sectional views showing a manufacturing process of the present embodiment. FIG. 5B shows across-sectional structure at the time when the process up to the first crystal growth has been completed. FIG. 5C shows across-sectional structure at the time when stripe processing is done on this by etching. FIG. 5D shows across-sectional structure at the time when the process up to the buried growth has been completed. FIG. 5E shows a cross-sectional structure at the time when grooves are formed on both sides of the optical waveguide stripe. FIGS. 5F and 5G show cross-sectional structures taken along a line A-A' and a line B-B' after electrode formation, respectively.

An active layer stripe of this element is constructed with a structure in which an n-InP buffer layer 302, an n-InP lower clad layer 303, an undoped AlGaInAs/AlGaInAs multi-quantum well core layer 304 (well thickness of 10 nm, well layers including 12 layers, barrier layer thickness of 10 nm, and transition wavelength of 1370 nm), a ruthenium (Ru) doped semi-insulating InP layer 305, an n-InP upper clad layer 306, and an n-InGaAs contact layer 307 are layered on a semi-insulating InP substrate 301, sequentially from lower layer. Each of these layers are processed and formed as follows. These layers are layered by the first crystal growth using metal-organic chemical vapor deposition (MOVPE). By providing an etching stop mask 308 on the surface of this layered structure and etching it, a stripe optical waveguide 309 is formed. By this stripe optical waveguide 309 being buried in the second crystal growth with a ruthenium (Ru) doped semi-insulating InP layer 310 and an n-InGaAs buried contact layer 311, the so-called high-resistance buried hetero (SI-BH) structure is formed.

Next, on this surface, an SiN etching stop mask 312 is formed, and the ruthenium (Ru) doped semi-insulating InP layer 310 and the n-InGaAs buried contact layer 311 are etched to a desired width. Following this, an SiN film 313 is provided on the surface and an opening is provided near the contact layer, and subsequently a Ti—Pd—Au electrode film is deposited over the whole surface. This electrode constitutes the below cut-off parallel plates to the electric field of a modulation RF signal applied to the undoped AlGaInAs/ AlGaInAs multi-quantum well core layer 304. By changing the width of the SiN etching stop mask 312, the effective refractive index and the characteristic impedance of the modulation RF signal propagating thereon are controlled.

Following this, this electrode is separated into a Ti—Pd— Au upper electrode 314 and a Ti—Pd—Au lower electrode 315 by the photolithography technique and etching. In a region near the signal light input/emission end faces, in order to inhibit a modulation RF signal from propagating thereon, after the n-InGaAs contact layer 307 and the n-InGaAs buried contact layer 311 are partially removed, a higher-resistance region 316 whose conductivity is suppressed by Ti ion implantation is formed. Finally, both ends of the optical waveguide are cleaved and both end faces are treated to have each a low reflective film 317 thereon whose reflectance is less than or equal to 0.1%, whereby signal light input/emission end faces are formed. The length of this element is 2 mm and an interaction length of a signal light and the electrode is 1.9 mm.

An insertion loss of this element of a modulated signal light of the wavelength of 1530 to 1570 nm inputted in a TE mode was about 3 dB. Moreover, the characteristic impedance of the traveling wave electrode was about 50Ω, the modulation frequency band was 45 GHz, and reflection was −13 dB or less over a range of DC to 45 GHz. Moreover, the phase of a modulated signal light of the wavelength of 1530 to 1570 nm changed by π radian with a bias voltage of 2.5 V.

Third Embodiment

Figure 6A:
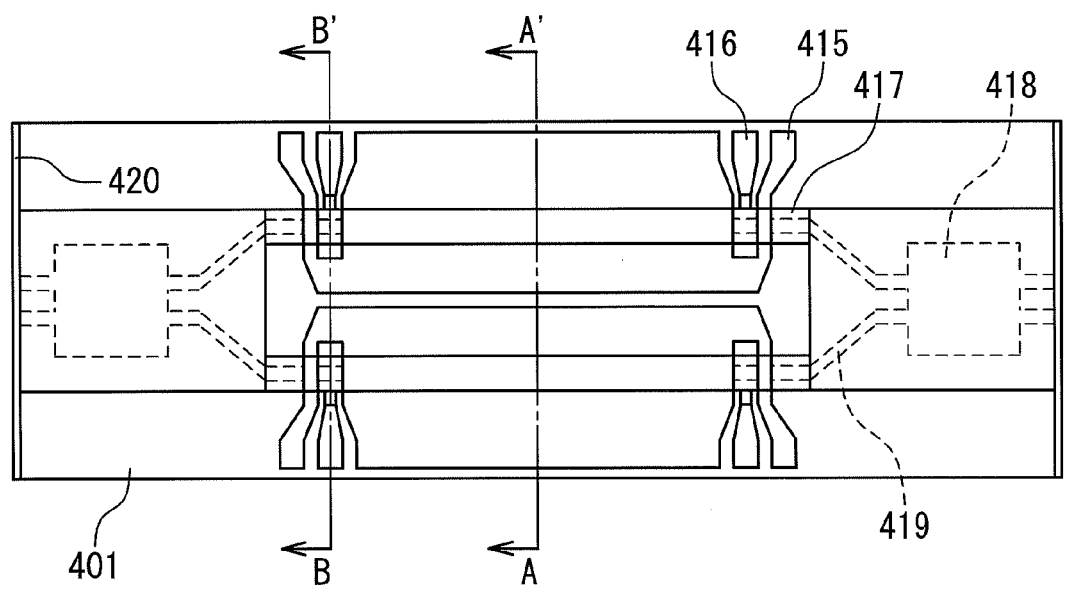
FIG. 6A is a plan view of an MZ light intensity modulator.
Figure 6B:
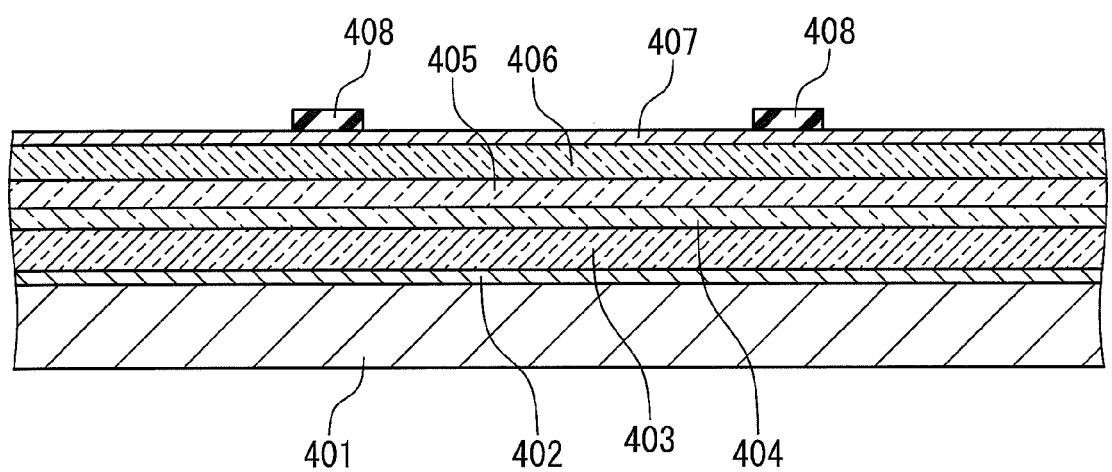
FIG. 6B shows one step of the manufacturing process of the MZ light intensity modulator.
Figure 6C:
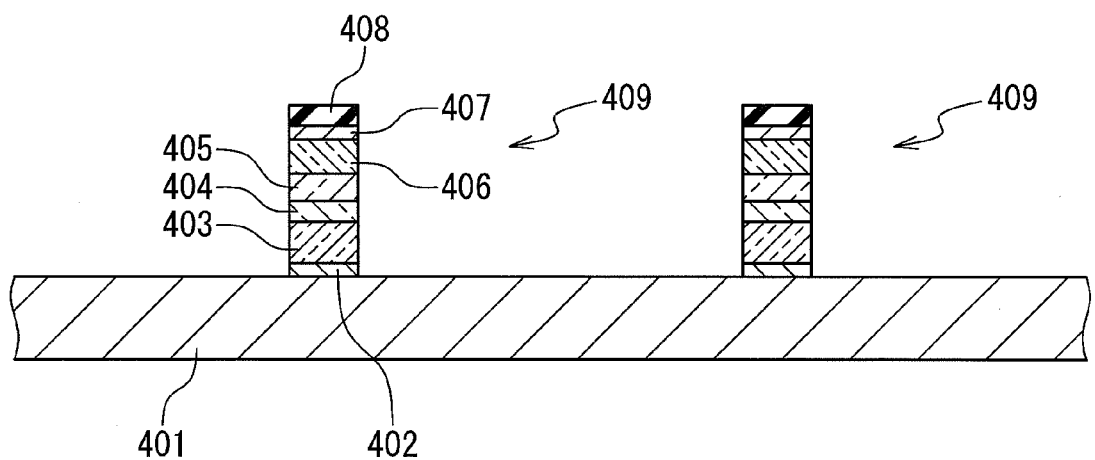
FIG. 6C shows one step of the manufacturing process of the MZ light intensity modulator.
Figure 6D:
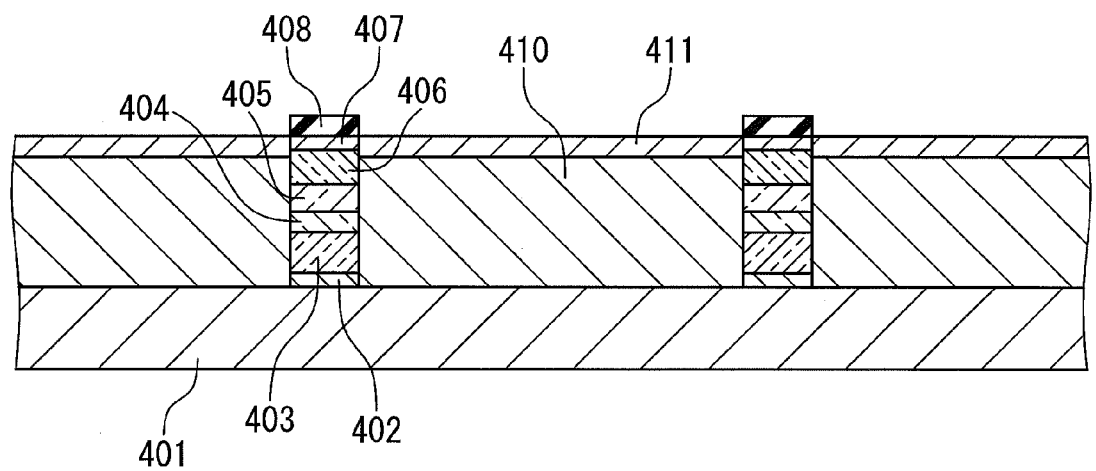
FIG. 6D shows one step of the manufacturing process of the MZ light intensity modulator.
Figure 6E:
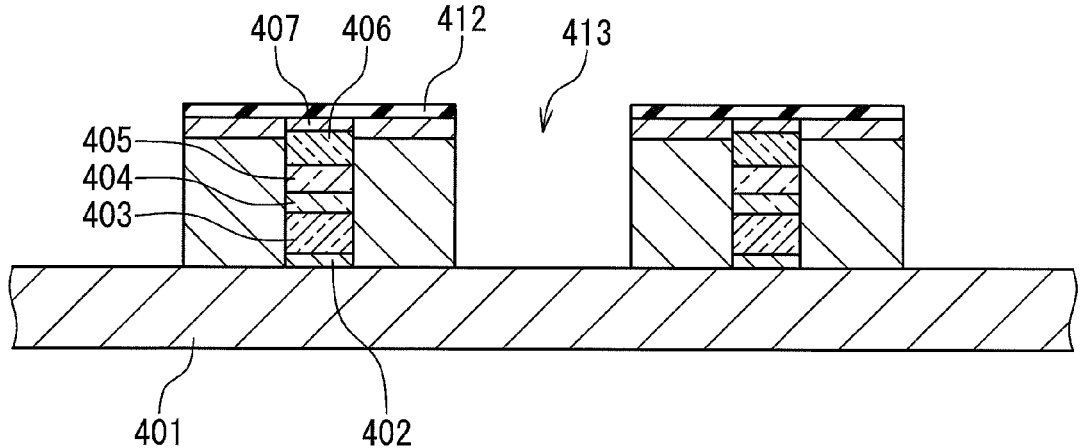
FIG. 6E shows one step of the manufacturing process of the MZ light intensity modulator.
Figure 6F:
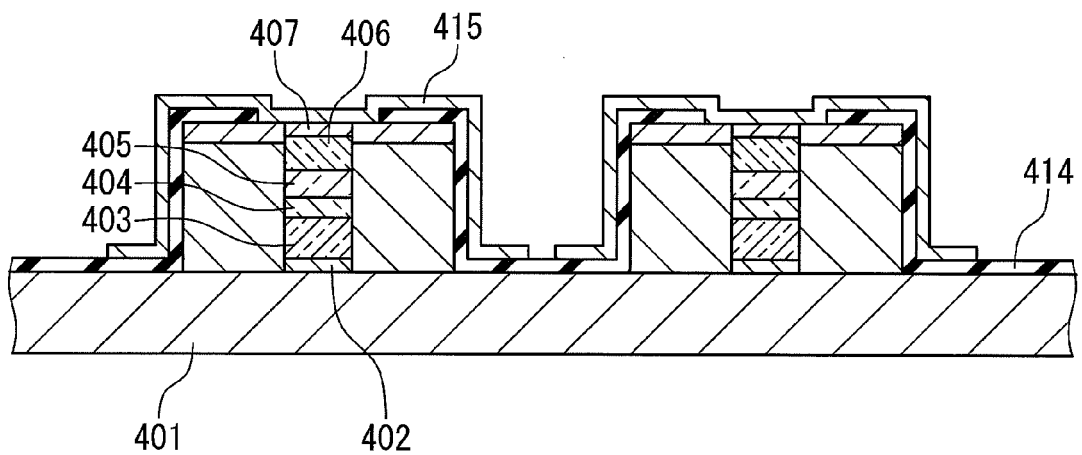
FIG. 6F shows a cross section of the MZ light intensity modulator.
Figure 6G:
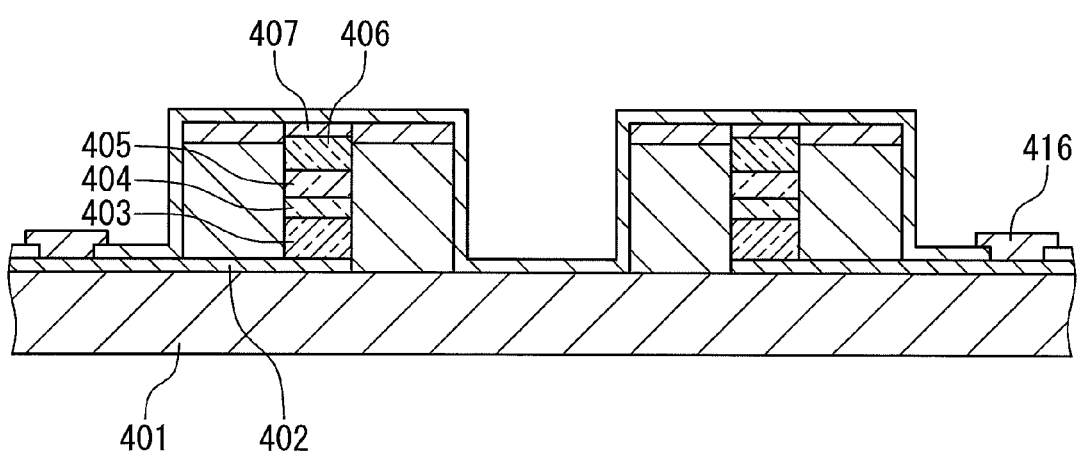
FIG. 6G shows a cross section of the MZ light intensity modulator.

FIG. 6A is a plan view showing a configuration of a semiconductor Mach Zehnder (MZ) light intensity modulator to which a semiconductor optical modulator in a third embodiment of the present invention is applied. FIGS. 6B to 6G are sectional views showing a manufacturing process of an MZ light intensity modulator. FIG. 6B shows a cross-sectional structure at the time when the process up to the first crystal growth has been completed. FIG. 6C shows a cross-sectional structure at the time when the stripe processing by etching is done. FIG. 6D shows a cross-sectional structure at the time when the process up to a buried growth has been completed. FIG. 6E shows a cross-sectional structure at the time when grooves are formed on both sides of the optical waveguide stripe. FIGS. 6F and 6G show cross-sectional structures taken along a line A-A' and a line B-B', respectively, after the electrode formation.

This element is formed as follows. A buffer layer 402, a lower clad layer 403, an undoped core layer 404, an insulating layer 405, an upper clad layer 406, and a contact layer 407 are continuously formed on a semi-insulating semiconductor substrate 401 by the first crystal growth, sequentially from lower layer. By providing an etching stop mask 408 on the surface of this layered structure and etching it, a stripe optical waveguide 409 of the MZ interferometer is formed. In the second crystal growth, by this stripe optical waveguide 409 being buried with a buried layer 410 and a buried contact layer 411, the so-called high-resistance buried (SI-BH) structure is formed.

Next, on this surface, an etching stop mask 412 is formed, and the buried layer 410 and the buried contact layer 411 are etched into a desired width. In doing this, an isolation groove 413 that insulates the pair of stripe optical waveguides mutually is also formed. Following this, an insulating film 414 is provided on the surface, an opening is provided near the contact layer, and subsequently the electrode film is deposited over the whole surface. This electrode constitutes the below cut-off parallel plates to the electric field of a modulation RF signal applied to the undoped core layer 404. By adjusting the width of the etching stop mask 412 to control the width of this parallel plates, the effective refractive index and the characteristic impedance of the modulation RF signal propagating thereon are controlled.

Following this, this electrode is separated into an upper electrode 415 and a lower electrode 416 by the photolithography technique and etching. In a region near the signal light input/emission end faces, in order to inhibit a modulation RF signal from propagating thereon, after the contact layer 407 and the buried contact layer 411 are partially removed, a higher-resistance region 417 whose conductivity is suppressed by ion implantation is formed. The pair of optical wave guide stripes is connected to a two-input/output multi-mode interference type optical multi/demultiplexer 418 through bend optical waveguides 419. Finally, both ends of the optical waveguide are cleaved, and both end faces are treated to have each a low reflective film 420 thereon, whereby signal light input/emission end faces are formed.

Next, an operation of a semiconductor MZ light intensity modulator in the third embodiment will be explained. The upper electrode 414 and the lower electrode 415 are connected to the drive circuit, and an electric field is applied to the undoped core layer 404. Consequently, the electromagnetic field of a modulation RF signal reduces in wavenumber receiving an effect of the below cut-off parallel plates that are formed with the same film as that of the upper electrode 414, its effective refractive index approaches to that of the signal light, and with this, a fall of the characteristic impedance that the modulation RF signal senses can also be suppressed. Thereby, it becomes possible to make the semiconductor MZ light intensity modulator according to the present embodiment operate as an ideal traveling wave type optical phase modulator such that the pair of stripe optical waveguides makes the above-mentioned velocity matching and impedance matching compatible with each other.

Figure 7A:
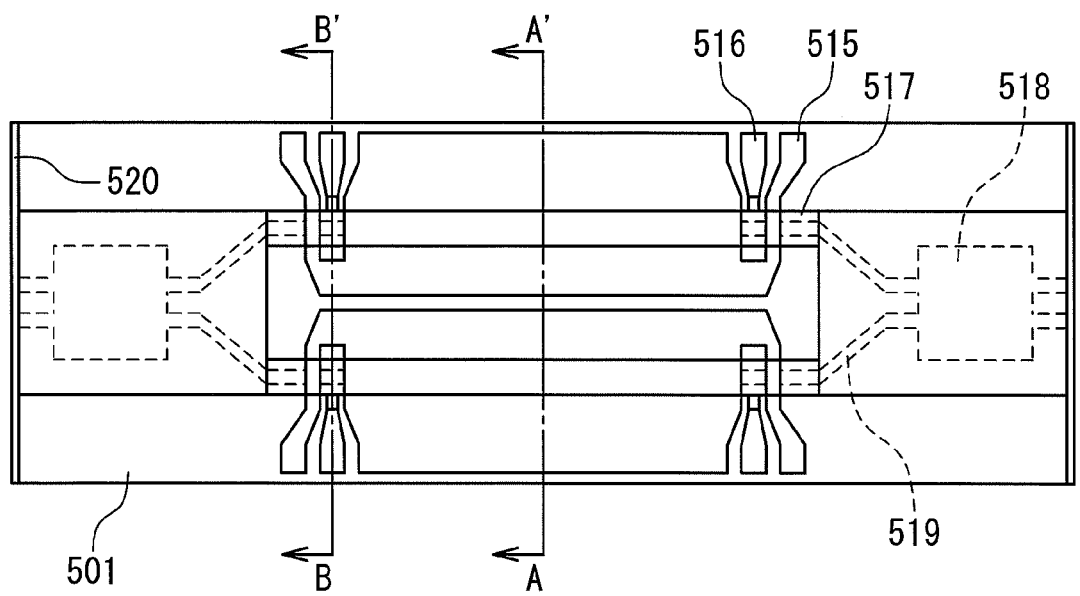
FIG. 7A is a plan view of an MZ light intensity modulator.
Figure 7B:
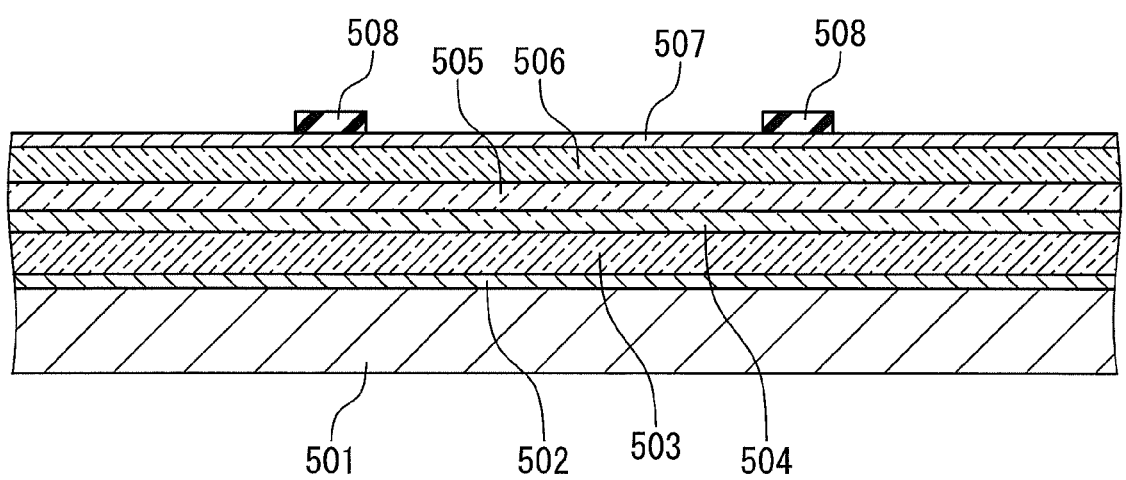
FIG. 7B shows one step of the manufacturing process of the MZ light intensity modulator.
Figure 7C:
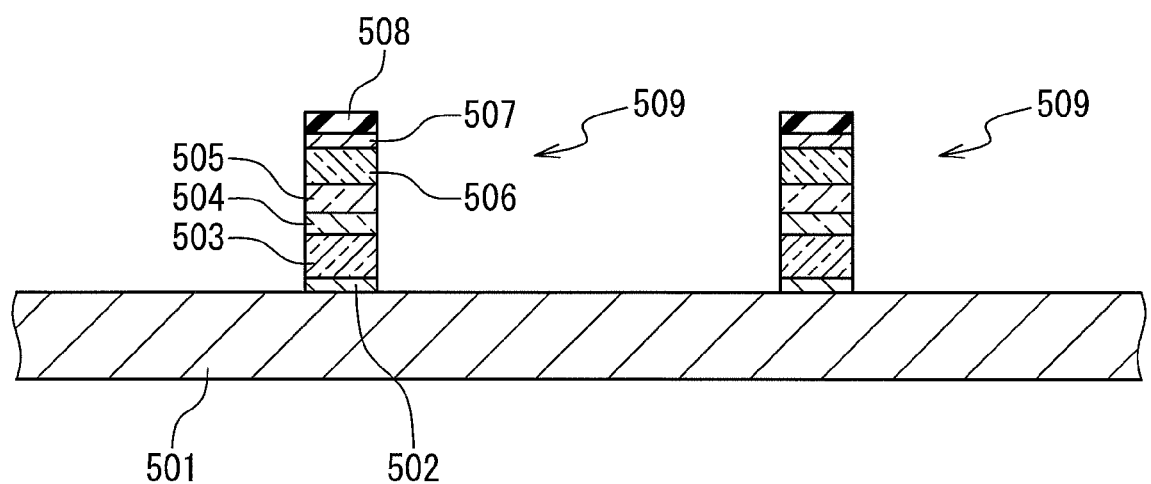
FIG. 7C shows one step of the manufacturing process of the MZ light intensity modulator.
Figure 7D:
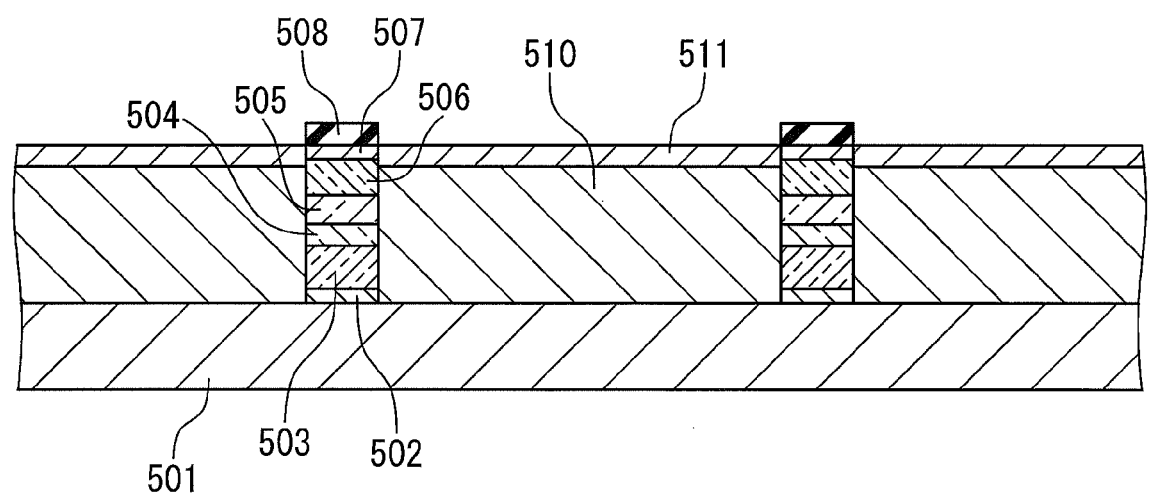
FIG. 7D shows one step of the manufacturing process of the MZ light intensity modulator.
Figure 7E:
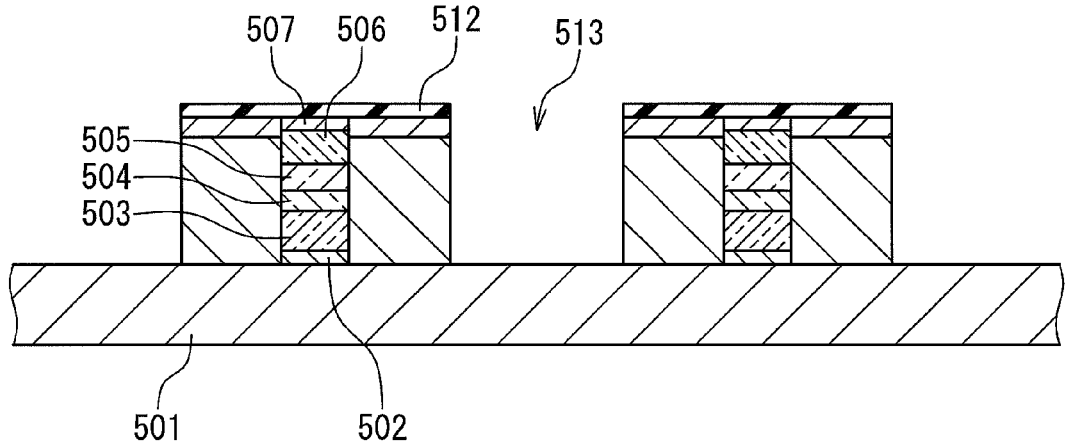
FIG. 7E shows one step of the manufacturing process of the MZ light intensity modulator.
Figure 7F:
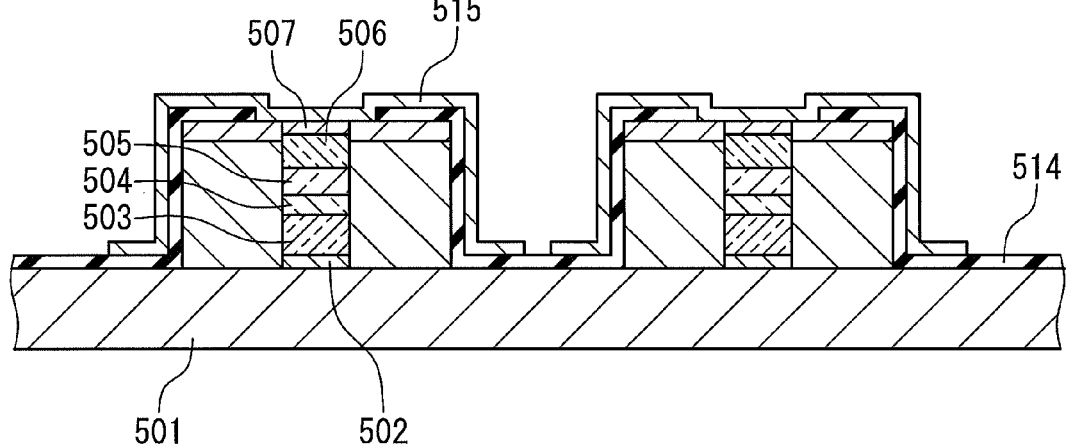
FIG. 7F shows a cross section of the MZ light intensity modulator.
Figure 7G:
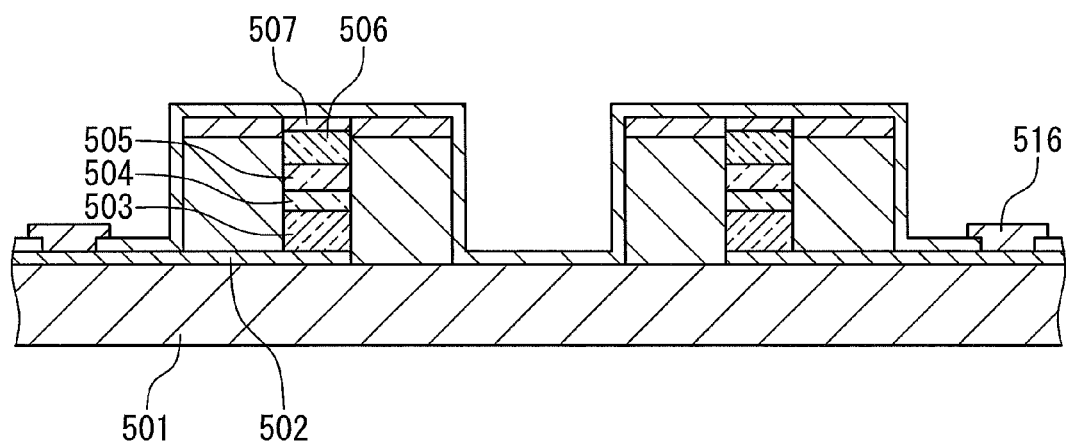
FIG. 7G shows a cross section of the MZ light intensity modulator.

FIG. 7A is a plan view showing an example of a verification of the third embodiment of the present invention in a semiconductor optical phase modulator. FIGS. 7B to 7G are sectional views showing a manufacturing process of this example. FIG. 7B shows a cross-sectional structure at the time when the first crystal growth has been completed. FIG. 7C shows a cross-sectional structure at the time when the stripe processing by etching is done. FIG. 7D shows a cross-sectional structure at the time when the process up to the buried growth has been completed. FIG. 7E shows a cross-sectional structure at the time when grooves are formed on both sides of the optical waveguide stripe. FIGS. 7F and 7G show cross-sectional structures taken along a line A-A' and a line B-B', respectively.

This element is manufactured by following steps. An n-InP buffer layer 502, an n-InP lower clad layer 503, an undoped AlGaInAs/AlGaInAs multi-quantum well core layer 504, an Ru doped semi-insulating InP layer 505, an n-InP upper clad layer 506, and an n-InGaAs contact layer 507 are formed continuously on a semi-insulating InP substrate 501 by the first crystal growth, sequentially from lower layer. By an SiN etching stop mask 508 of a stripe shape being provided on the surface of this layered structure and the layered structure being etched, a stripe optical waveguide 509 that constitutes the MZ interferometer is formed. By this stripe optical waveguide 509 being buried by an Ru doped semi-insulating InP buried layer 510 and an n-InGaAs buried contact layer 511 in the second crystal growth, the so-called high-resistance buried (SI-BH) structure is formed. The interval between respective central axes of the pair of stripe optical waveguides is 50 μm.

Next, an SiN etching stop mask 512 of width 8 μm is formed on this surface. The Ru doped semi-insulating InP buried layer 510 and the n-InGaAs buried contact layer 511 are etched. In this process, an isolation groove 513 that insulates the pair of stripe optical waveguides mutually is also formed. Following this, an SiN film 514 is provided on the surface, an opening is provided near the contact layer, and subsequently the Ti—Pd—Au electrode film is deposited over the whole surface. This electrode constitutes the below cut-off parallel plates to the electric field of a modulation RF signal applied to the undoped AlGaInAs/AlGaInAs multi-quantum well core layer 504. By changing the width of the SiN etching stop mask 512, the effective refractive index and the characteristic impedance of the modulation RF signal propagating thereon are controlled.

Following this, this electrode is separated into a Ti—Pd—Au upper electrode 515 and a Ti—Pd—Au lower electrode 516 by the photolithography technique and etching. In a region near the signal light input/emission end faces, in order to inhibit a modulation RF signal from propagating thereon, after the n-InGaAs contact layer 507 and the n-InGaAs buried contact layer 511 are partially removed, a higher-resistance region 517 whose conductivity is suppressed by Ti ion implantation is formed. The pair of stripe optical waveguides is connected to a two-input/output multimode interference type optical multi/demultiplexer 518 through bend optical waveguides 519. Finally, the both ends of the optical waveguide are cleaved, and both end faces are treated to have each a low reflective film 520 thereon whose reflectance is less than or equal to 0.1%, whereby the signal light input/emission end faces are formed. The length of this element is 3 mm, and the interaction length of the signal light and the electrode is 1.9 mm.

The insertion loss for a modulated signal light of the wavelength of 1530 to 1570 nm entered into this element in the TE mode was about 6 dB. Moreover, the characteristic impedance of the traveling wave electrode was about 50Ω, the modulation frequency band was 45 GHz, and reflection was −13 dB or less over the range of DC to 45 GHz. Moreover, the modulated signal light of the wavelength of 1530 to 1570 nm exhibited an extinction operation with a bias voltage of 2.5V, and its extinction ratio was 15 dB.

Specifically when realizing an ultra high-speed optical modulator intended for feeder optical fiber communication systems and its integrated optical elements, band restriction of the optical modulation characteristic and an increase in a drive voltage arising from velocity mismatch and impedance mismatch were serious problems. As described in the foregoing, an optical modulator according to the present invention provides a structure that can improve these problems effectively by using a below cut-off parallel plate effect of the pair of conductor walls that is parallel to the electric field applied to the undoped core layer without using special parts separately while keeping a manufacturing process as with the same steps, and opens a road of providing a broader-band and lower-voltage hybrid integrated optical module in high volume and stably.

The invention claimed is:

1. A semiconductor optical modulator comprising:
a heterostructure single mode semiconductor optical waveguide which includes:
a stripe optical waveguide in which a lower clad layer formed on a semiconductor substrate and having a first conductivity, an undoped core layer in which a complex refractive index for a signal light propagating therein is changed in response to a strength of an applied electric field, and an upper clad layer having a second conductivity, which are layered in this order from lower layer; and
a semi-insulating buried layer formed to sandwich the stripe optical waveguide from its left and right;
a below cut-off parallel plates arranged on a side wall of the semi-insulating buried layer on a side to which the stripe optical waveguide is not contacted, and composed of a pair of conductor walls arranged on left and right of the stripe optical waveguide; and
a pair of electrodes configured to provide potentials to the lower clad layer and the upper clad layer independently and to form a transmission line in which an RF signal propagates in parallel with a signal light propagating in the undoped core layer.

2. The semiconductor optical modulator according to claim 1, wherein at least one of the pair of below cut-off parallel plates is in conduction with either one of an upper electrode in conduction with the upper clad layer or a lower electrode in conduction with the lower clad layer.

3. The semiconductor optical modulator according to claim 1, wherein the pair of below cut-off parallel plates has a same potential with one another.

4. The semiconductor optical modulator according to claim 1, wherein both of the upper clad layer and the lower clad layer are formed by an n-type semiconductor.

5. The semiconductor optical modulator according to claim 1, further comprising:
an electron injection stop layer arranged between at least one of the upper clad layer and the lower clad layer, and the undoped core layer.

6. The semiconductor optical modulator according to claim 5, wherein the electron injection stop layer is formed by a semi-insulating semiconductor doped with ruthenium or iron.

7. The semiconductor optical modulator according to claim 5, wherein the electron injection stop layer is formed by a p-type semiconductor doped with zinc, beryllium or carbon.

8. The semiconductor optical modulator according to claim 5, further comprising:
a p-type semiconductor layer whose thickness is 10 nm or less and whose impurity concentration is higher than an electron trap concentration of the electron injection stop layer inwardly from a plane of the electron injection stop layer that is in contact with the undoped core layer.

9. The semiconductor optical modulator according to claim 1, wherein light is modulated by a Franz-Keldysh effect, a Pockels effect, a quantum confinement Stark effect, or a quantum confinement Pockels effect in the undoped core layer.

10. The semiconductor optical modulator according to claim 1, wherein the stripe optical waveguide is coupled to a wavelength tunable light source formed on the substrate through an optical multiplexer and demultiplexer formed on the substrate.

11. A Mach-Zehnder type optical modulator comprising the semiconductor optical modulator according to claim 1 which is built in in at least one of a pair of optical waveguides forming an optical waveguide type Mach-Zehnder type optical interferometer.

* * * * *